(12) United States Patent
Zhou et al.

(10) Patent No.: US 9,337,938 B2
(45) Date of Patent: May 10, 2016

(54) SIGNAL PROCESSING METHOD, OPTICAL RECEIVER AND OPTICAL NETWORK SYSTEM

(71) Applicant: HUAWEI TECHNOLOGIES CO., LTD., Shenzhen (CN)

(72) Inventors: Lei Zhou, Shenzhen (CN); Zhenxing Liao, Shenzhen (CN); Zhenping Wang, Shenzhen (CN); Ning Cheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 14/331,597

(22) Filed: Jul. 15, 2014

(65) Prior Publication Data

US 2014/0328592 A1 Nov. 6, 2014

Related U.S. Application Data

(63) Continuation of application No. PCT/CN2012/072712, filed on Mar. 21, 2012.

(51) Int. Cl.
*H04B 10/61* (2013.01)
*H04Q 11/00* (2006.01)

(52) U.S. Cl.
CPC ............ *H04B 10/6164* (2013.01); *H04B 10/61* (2013.01); *H04Q 11/0067* (2013.01)

(58) Field of Classification Search
CPC . H04B 10/61; H04B 10/6164; H04Q 11/0067
See application file for complete search history.

(56) References Cited

U.S. PATENT DOCUMENTS

2003/0090768 A1 5/2003 Liu et al.
2007/0133993 A1* 6/2007 Yee .................. H04B 10/50
398/85

(Continued)

FOREIGN PATENT DOCUMENTS

CN 101507149 A 8/2009
CN 101510804 A 8/2009

(Continued)

OTHER PUBLICATIONS

PCT International Search Report and PCT Written Opinion; Forms PCT/ISA/210, PCT/ISA/220, and PCT/ISA/237, dated Mar. 21, 2012 in corresponding PCT Application No. PCT/CN2012/072712 (12 pages).
"*Coherent Optical Access Networks*"; Harald Rohde, Sylvia Smolorz, Jun Shan Wey, Erich Gottwald; OSA/OFC/NFOEC 2011; Nokia Siemens Networks, Munich, Germany; (3 pages).

(Continued)

*Primary Examiner* — David Payne
*Assistant Examiner* — Omar S Ismail
(74) *Attorney, Agent, or Firm* — Staas & Halsey LLP

(57) ABSTRACT

A signal processing method, an optical receiver and optical network system is provided. The method includes: receiving a first optical signal sent by an optical network unit, generating a second optical signal and modulating a phase of the second optical signal, obtaining at least one path of electrical signals after the first optical signal and the second optical signal separately undergo polarization splitting, frequency mixing, and optical-electrical conversion, outputting a third electrical signal after performing operation processing on the at least one path of electrical signals, and restoring a data signal according to the third electrical signal and performing sending. The embodiments example benefits are greatly reducing complexity of system implementation and maximally reducing a system upgrade cost and an optical power loss.

10 Claims, 6 Drawing Sheets

(56) References Cited

U.S. PATENT DOCUMENTS

| | | | |
|---|---|---|---|
| 2007/0183738 A1* | 8/2007 | Welch | B82Y 20/00 385/147 |
| 2009/0279886 A1* | 11/2009 | Suvakovic | H04L 7/10 398/26 |
| 2010/0021179 A1* | 1/2010 | Kikuchi | H04B 10/61 398/183 |
| 2010/0260504 A1 | 10/2010 | Takahara | |
| 2010/0266291 A1* | 10/2010 | Boffi | H04B 10/61 398/159 |
| 2013/0230312 A1* | 9/2013 | Randel | H04B 10/611 398/25 |

FOREIGN PATENT DOCUMENTS

| | | |
|---|---|---|
| CN | 102064890 A | 5/2011 |
| JP | 2010-251851 | 11/2010 |

OTHER PUBLICATIONS

"*Coherent Detection for 1550nm, 5 Gbit/s VCSEL Based 40km Bidirectional PON Transmission*"; Jesper Bevensee Jensen, Roberto Rodes, Darko Zibar, Idelfonso Tafur Monroy; OSA/OFC/NFOEC 2011; DTU Fotonik, Technical University of Denmark; 2010 (3 pages).

\* cited by examiner

SIGNAL PROCESSING METHOD, OPTICAL RECEIVER AND OPTICAL NETWORK SYSTEM

CROSS-REFERENCE TO RELATED APPLICATIONS

This application is a continuation of International Application No. PCT/CN2012/072712, filed on Mar. 21, 2012, which is hereby incorporated by reference in its entirety.

TECHNICAL FIELD

Embodiments of the present invention relate to the field of optical communications, and in particular, to a signal processing method, an optical receiver and an optical network system.

BACKGROUND

A passive optical network (Passive Optical Network, PON) gradually becomes a mainstream technology in the broadband access field. As various broadband services such as videoconferencing, 3D television, mobile backhaul, and an interactive game develop fast, a requirement on an access bandwidth becomes higher. Facing future evolution of broadband, a broader bandwidth, a longer distance, and larger splitting are required. In a typical PON system, a plurality of terminals (Optical Network Unit, ONU) connects to an optical splitter (Splitter) by using an optical fiber, and, after convergence by an optical splitter, connects to an optical line terminal (Optical Line Terminal OLT) by using a trunk fiber. An ONU shares the trunk fiber by means of TDMA (Time Division Multiple Access, time division multiple access). In a network upgrade process, the ONU shall try to remain unchanged or slightly change at a low cost, so as to protect an existing investment; and an increase in a splitting ratio of an optical splitter means a larger loss in optical power. A universal manner at present for increasing a power budget in the condition of keeping a passive characteristic of the PON includes: introducing a coherent receiving technology, amplifying an optical signal by introducing an optical local oscillator with relatively high power. In addition, an optical receiver works in shot noise dominated status and is capable of reaching a shot noise limit of the receiver, which greatly improves sensitivity. A coherent detection technology applies to any band. However, a coherent receiving technology at present requires precision control over a frequency offset between the optical local oscillator and the optical signal, leading to complexity and an expensive cost of an implementation process of the receiver. Once there is a relatively large error in the frequency offset at the receiver end, a relatively large loss in the optical power is caused.

SUMMARY

Embodiments of the present invention provide a signal processing method, an optical receiver and an optical network system, which solves a problem of complexity and an expensive cost of an implementation process caused by a coherent receiving technology of an existing receiver requiring precision control over a frequency offset between an optical local oscillator and optical signal. The technical solutions are as follows:

An embodiment of the present invention provides a signal processing method and the method includes:

receiving a first optical signal sent by an optical network unit;

generating a second optical signal and modulating a phase of the second optical signal so that a difference between a phase of the second optical signal in the second half period and a phase of the second optical signal in the first half period is 90 degrees, where the one period is time required for transmitting any 1 bit in the first optical signal;

obtaining at least one path of electrical signals after the first optical signal and the second optical signal separately undergo polarization splitting, frequency mixing, and optical-electrical conversion;

performing operation processing on the at least one path of electrical signals, and outputting a third electrical signal; and restoring a data signal according to the third electrical signal and sending the restored data signal.

An embodiment of the present invention provides an optical receiver, and the optical receiver includes:

a first receiver, configured to receive a first optical signal sent by an optical network unit;

a laser, configured to generate a second optical signal and send the second optical signal to a phase modulator;

the phase modulator, configured to modulate a phase of the second optical signal so that a difference between a phase of the second optical signal in the second half period and a phase of the second optical signal in the first half period is 90 degrees, where the one period is time required for transmitting any 1 bit in the first optical signal;

a polarization beam splitter, configured to perform polarization splitting separately on the first optical signal and the second optical signal and then input the polarization-split optical signals to a frequency mixer;

the frequency mixer, configured to perform the frequency mixing processing on the polarization-split optical signals;

a first photodetector, configured to perform optical-electrical conversion after detecting the optical signals that have undergone the frequency mixing processing, and output at least one path of electrical signals;

a processor, configured to perform operation processing on the at least one path of electrical signals, and output a third electrical signal;

a data extracting unit, configured to restore a data signal according to the third electrical signal; and a second receiver, configured to send the restored data signal.

An embodiment of the present invention provides an optical network system, and the optical network system includes at least a piece of central office equipment and an optical network unit, where the central office equipment includes any one of the foregoing optical receivers.

Embodiments of the present invention provide a signal processing method, an optical receiver and an optical network system, where the method includes receiving a first optical signal sent by an optical network unit; generating a second optical signal and modulating a phase of the second optical signal so that a difference between a phase of the second optical signal in the second half period and a phase of the second optical signal in the first half period is 90 degrees, where the one period is time required for transmitting any 1 bit in the first optical signal; obtaining at least one path of electrical signals after the first optical signal and the second optical signal separately undergo polarization splitting, frequency mixing, and optical-electrical conversion; performing operation processing on the at least one path of electrical signals, and outputting a third electrical signal; and, restoring a data signal according to the third electrical signal and sending the restored data signal Implementing the solutions of the embodiments enable correct coherent receiving of a locally generated second optical signal in a situation in which an arbitrary frequency offset exists between the second optical signal and the first optical signal, thereby greatly reducing complexity of system implementation and maximally reducing a system upgrade cost and an optical power loss.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
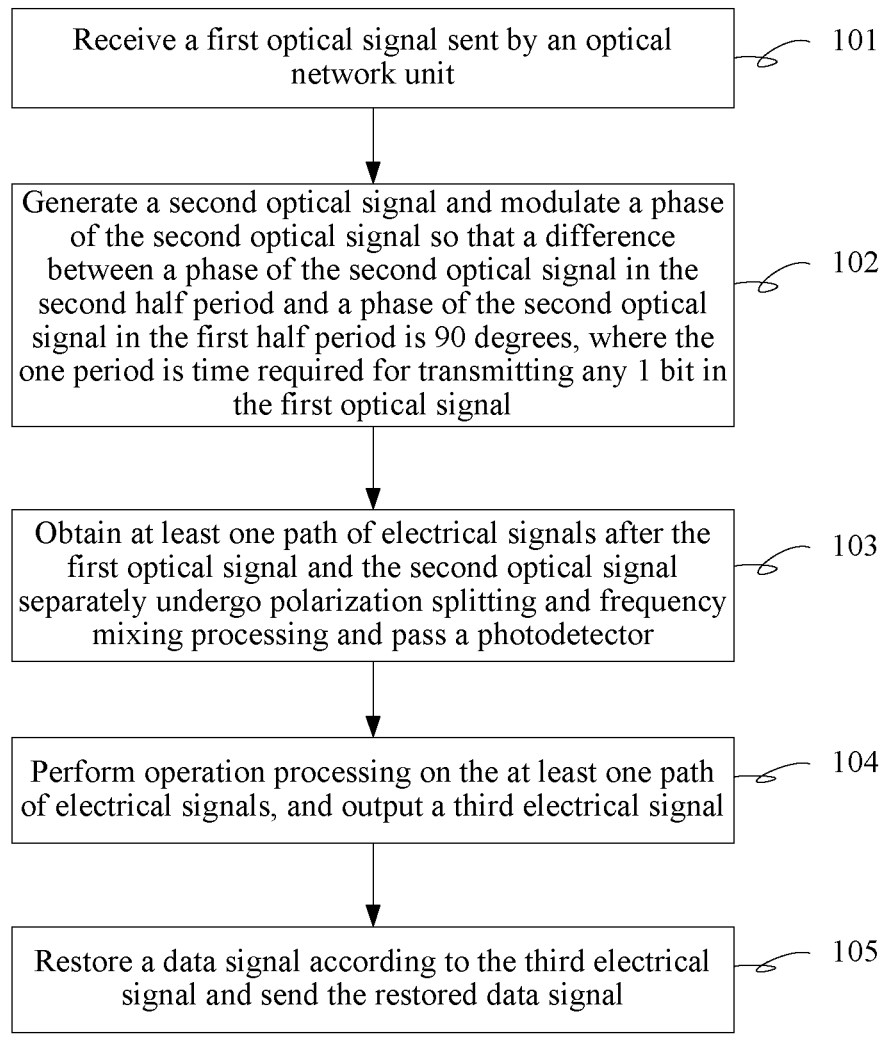
FIG. 1 is a flowchart of a signal processing method according to an embodiment of the present invention.

FIG. 1 is a flowchart of a signal processing method according to an embodiment of the present invention. The execution body of the embodiment is an optical receiver. Refer to FIG. 1. The embodiment specifically includes:

101. Receive a first optical signal sent by an optical network unit.

102. Generate a second optical signal and modulate a phase of the second optical signal so that a difference between a phase of the second optical signal in the second half period and a phase of the second optical signal in the first half period is 90 degrees, where the one period is time required for transmitting any 1 bit in the first optical signal.

The second optical signal is generated by an optical local oscillator in the optical receiver.

103. Obtain at least one path of electrical signals after the first optical signal and the second optical signal separately undergo polarization splitting, frequency mixing, and optical-electrical conversion.

104. Perform operation processing on the at least one path of electrical signals, and output a third electrical signal.

By means of the phase modulation in step 102, the operation processing in step 104 may eliminate a frequency offset and a phase difference so that the sum-of-squares signal is not affected by the frequency offset and the phase difference between the first optical signal and the second optical signal.

105. Restore a data signal according to the third electrical signal and send the restored data signal.

The signal processing method provided in the embodiment of the present invention enables correct coherent receiving of a locally generated second optical signal in a situation in which an arbitrary frequency offset exists between the second optical signal and the first optical signal, thereby greatly reducing complexity of system implementation and maximally reducing a system upgrade cost and an optical power loss.

Figure 2:
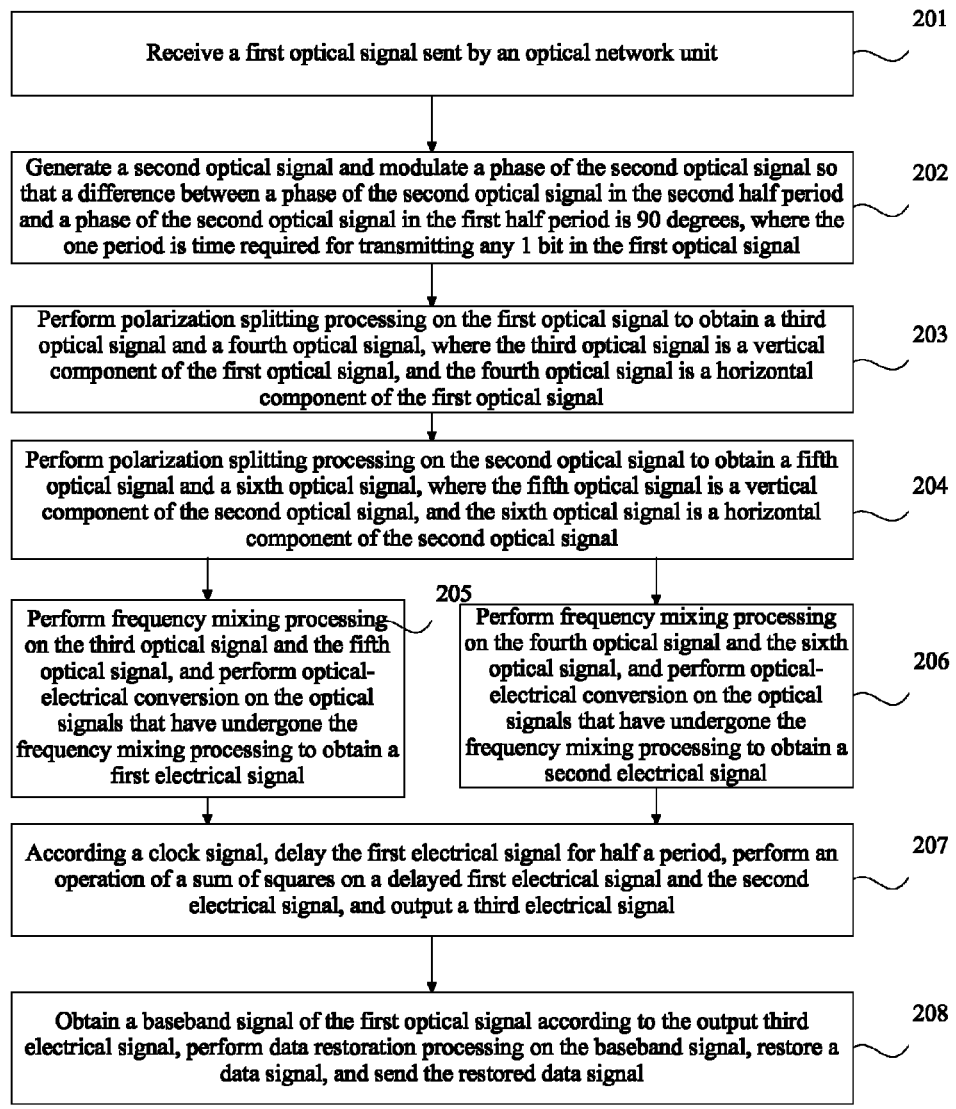
FIG. 2 is a flowchart of a signal processing method according to an embodiment of the present invention.

FIG. 2 is a flowchart of a signal processing method according to an embodiment of the present invention. The execution body of the embodiment is an optical receiver. Refer to FIG. 2. The embodiment specifically includes:

201. Receive a first optical signal $E_S$ from an optical network unit, where a period of the first optical signal $E_S$ is T.

The period described in the embodiment refers to a bit period, and one bit period refers to time required for transmitting any 1 bit in the first optical signal $E_S$.

The optical receiver may be located in a piece of central office equipment. The central office equipment may be an OLT (Optical Line Terminal, optical line terminal), and the first optical signal is an optical signal received from the optical network unit by using an optical distribution network.

202. Generate a second optical signal and modulate a phase of the second optical signal so that a difference between a phase of the second optical signal in the second half period (T/2, T) and a phase of the second optical signal in the first half period (0, T/2) is 90 degrees, where the one period is time required for transmitting any 1 bit in the first optical signal.

Polarization vibration directions of the generated second optical signal and the received first optical signal are the same.

For the phase modulation of the second optical signal, it may be understood that, by means of phase modulation, the phase of the second optical signal is unchanged within (0, T/2) and reverses by 90 degrees within (T/2, T).

If a time point of receiving the first optical signal $E_S$ is considered as time point 0, for the second optical signal, the first half period of a bit period of the first optical signal is (0, T/2) and the second half period of a bit period of the first optical signal is (T/2, T). In the embodiment, within (0, T/2), the second optical signal is not modulated, outputting an in-phase component; and within (T/2, T), the phase of the second optical signal is reversed by 90 degrees, outputting a quadrature phase component of the second optical signal.

Figure 3:
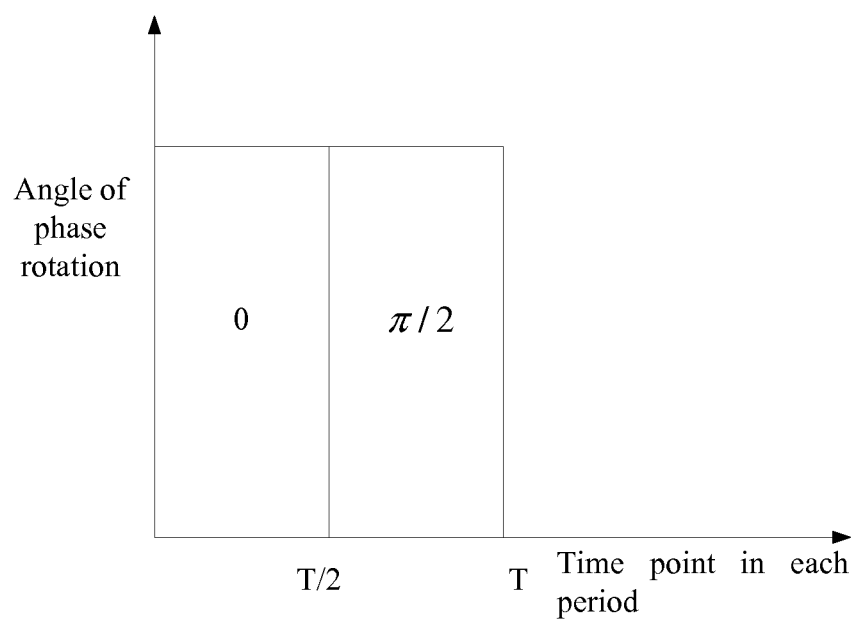
FIG. 3 is a diagram of a correspondence between a time point of each period and an angle of phase rotation in phase modulation according to an embodiment of the present invention.

Preferably, the second optical signal may be generated by a laser and the laser may specifically be an optical local oscillator. The phase modulation may be performed by using a phase modulator and the phase modulator periodically generates a sine wave and a cosine wave. The sine wave is generated in the first half period to perform modulation on the second optical signal, so that the phase of the second optical signal is unchanged. The cosine wave is generated in the second half period, so that the phase of the second optical signal reverses by 90 degrees. For a correspondence between a time point and a reversed phase in each period during the phase modulation, reference may be made to FIG. 3. In each bit period of the first optical signal, if a start time point of a bit period is considered as 0, a modulated phase amplitude of the second optical signal within (0, T/2) is 0, and a modulated phase amplitude of the second optical signal within (T/2, T) is π/2.

203. Perform polarization splitting processing on the first optical signal $E_S$ to obtain a third optical signal $E_{SI}$ and a fourth optical signal $E_{SQ}$. The third optical signal $E_{SI}$ is a vertical component of the first optical signal $E_S$. The fourth optical signal $E_{SQ}$ is a horizontal component of the first optical signal $E_S$.

A person skilled in the art may learn that, after polarization splitting processing on an optical signal, two beams of output optical signals are in mutually vertical polarization states and have same optical power.

204. Perform polarization splitting processing on the second optical signal $E_{LO}$ to obtain a fifth optical signal $E_{LOI}$ and a sixth optical signal $E_{LOQ}$. The fifth optical signal $E_{LOI}$ is a vertical component of the second optical signal $E_{LO}$. The sixth optical signal $E_{LOQ}$ is a horizontal component of the second optical signal $E_{LO}$.

A person skilled in the art may learn that, after polarization splitting processing on an optical signal, two beams of output optical signals are in mutually vertical polarization states and have same optical power.

In the embodiment, the polarization splitting processing on the first optical signal and the second optical signal may be performed synchronously or not synchronously. If the polarization splitting processing is performed not synchronously, before frequency mixing in a subsequent step, clock synchronization is required for an output after the polarization splitting processing. The clock synchronization may be performed by means of clock and data recovery (Clock and Data Recovery, CDR).

The splitting processing in steps 203 and 204 may be implemented by using a polarization beam splitter (PBS, Polarization Beam Splitter). After the polarization beam splitter is used to perform polarization splitting processing on an optical signal, two beams of output optical signals are in mutually vertical polarization states and have same optical power. There may be a plurality of types of polarization beam splitters, which is not specifically limited in embodiments of the present invention.

205. Perform frequency mixing processing on the third optical signal $E_{SI}$ and the fifth optical signal $E_{LOI}$, and perform optical-electrical conversion for the optical signals that have undergone the frequency mixing processing to obtain a first electrical signal $I_I(t)=R\sqrt{P_s P_{LO}} \cos\{w_{IF}t+\theta_s(t)\theta_{LO}(t)\}$, where, R is responsivity of the optical receiver, $P_s$ is power of the first optical signal, $P_{LO}$ is power of the second optical signal, $w_{IF}$ is a frequency offset between the first optical signal and the second optical signal, $\theta_{sig}(t)-\theta_{LO}(t)$ is a phase difference between the first optical signal and the second optical signal, and T is time.

In the embodiment, the fifth optical signal and the third optical signal are each a vertical component, an optical signal that is mutually parallel with the fifth optical signal in polarization state is the third optical signal. Therefore, in step 205, the frequency mixing processing is performed on the third optical signal and the fifth optical signal.

206. Perform frequency mixing processing on the fourth optical signal $E_{SQ}$ and the sixth optical signal $E_{LOQ}$, and perform optical-electrical conversion for the optical signals that have undergone the frequency mixing processing to obtain a second electrical signal $I_Q(t)=R\sqrt{P_s P_{LO}} \sin\{w_{IF}t+\theta_s(t)-\theta_{LO}(t)\}$.

In the embodiment, the sixth optical signal and the fourth optical signal are each a horizontal component, an optical signal that is mutually parallel with the sixth optical signal in polarization state is the fourth optical signal. Therefore, in step 206, the frequency mixing processing is performed on the fourth optical signal and the sixth optical signal.

Coupling in steps 205 and 206 may be performed by using a 2×2 frequency mixer, where the frequency mixer is configured to mix two optical signals together. For a typical 2×2 frequency mixer, when input of the 2×2 frequency mixer is $E_1$ and $E_2$, according to the formula $$\begin{bmatrix} E'_1 \\ E'_2 \end{bmatrix} = \frac{1}{\sqrt{2}} \begin{bmatrix} 1 & e^{j\pi/2} \\ e^{j\pi/2} & 1 \end{bmatrix} \begin{bmatrix} E_1 e^{j(\omega_1 t + \varphi_1(t))} \\ E_2 e^{j(\omega_2 t + \varphi_2(t))} \end{bmatrix},$$

the following output may be obtained:

$$E'_1 = \frac{1}{\sqrt{2}}(E_1 e^{j(\omega_1 t + \varphi_1(t))} + E_2 e^{j(\omega_2 t + \varphi_2(t) + \pi/2)})$$

$$E'_2 = \frac{1}{\sqrt{2}}(E_1 e^{j(\omega_1 t + \varphi_1(t) + \pi/2)} + E_2 e^{j(\omega_2 t + \varphi_2(t))})$$

The optical-electrical conversion may be performed by using a photodetector, where the photodetector is configured to convert a detected optical signal into an electrical signal for output.

After $E_1'$ and $E_2'$ undergo the optical-electrical conversion, $I_1$ and $I_2$ are obtained, as shown in the following formulas:

$$I_1 = R|E'_1|^2$$
$$= \frac{1}{4}R(E_1^2 + E_2^2 + 2E_1 E_2 \cos((\omega_1 - \omega_2)t + \varphi_1(t) - \varphi_2(t) - \frac{\pi}{2}))$$
$$= \frac{1}{4}R(E_1^2 + E_2^2 + 2E_1 E_2 \sin((\omega_1 - \omega_2)t + \varphi_1(t) - \varphi_2(t)))$$

$$I_2 = R|E'_2|^2$$
$$= \frac{1}{4}R(E_1^2 + E_2^2 + 2E_1 E_2 \cos((\omega_1 - \omega_2)t + \varphi_1(t) - \varphi_2(t) + \frac{\pi}{2}))$$
$$= \frac{1}{4}R(E_1^2 + E_2^2 - 2E_1 E_2 \sin((\omega_1 - \omega_2)t + \varphi_1(t) - \varphi_2(t)))$$

Finally, $I(t)=I_1-I_2=E_1 E_2 \sin((\omega_1-\omega_2)t+\omega_1(t)-\omega_2(t)))$.

In a common coherent receiver, to obtain cosine and sine current components of the optical signal illustrated in steps 205 and 206, use of a 90-degree optical frequency mixer is required, and a cost is significantly high. However, a cost of the 2×2 frequency mixer used herein is significantly low; in addition, two balancing receivers are reduced, thereby further reducing system complexity. In subsequent electrical domain processing, fewer resources are occupied, which meets a low cost requirement for an access network.

In the embodiment, the frequency mixing of each path of optical signals and the optical-electrical conversion may be performed synchronously or not synchronously. If the splitting processing is performed not synchronously, before an operation of a sum of squares is performed in a subsequent step, the first electrical signal and the second electrical signal need to be processed according to a clock signal.

207. According a clock signal, delay the first electrical signal $I_I(t)=R\sqrt{P_s P_{LO}} \cos\{w_{IF}t+\theta_s(t)-\theta_{LO}(t)\}$ for half a period, perform the operation of the sum of squares for a delayed first electrical signal and the second electrical signal $I_Q(t)=R\sqrt{P_s P_{LO}} \sin\{w_{IF}t+\theta_s(t)-\theta_{LO}(t)\}$, and output a third electrical signal $I_I(t)^2+I_Q(t)^2=R^2 P_s(t)P_{LO}$.

It should be noted that an electrical signal of the first electrical signal in the first half period of each bit period is $I_I(t)=R\sqrt{P_s P_{LO}} \cos\{w_{IF}t+\theta_s(t)-\theta_{LO}(t)\}$, and an electrical signal of the second electrical signal in the second half period of each bit period is $I_Q(t)=R\sqrt{P_s P_{LO}} \sin\{w_{IF}t+\theta_s(t)-\theta_{LO}(t)\}$. Therefore, before the operation of the sum of squares is performed, the first electrical signal needs to be delayed so that, after the operation of the sum of squares is performed on a delayed first electrical signal and the second electrical signal, $\{w_{IF}t+\theta_s(t)-\theta_{LO}(t)$ can be eliminated, that is, impact of the frequency offset between the first optical signal and the second optical signal is eliminated.

According to step 207, it may be seen that the frequency offset $w_{IF}$ and the phase difference $\theta_s(t)-\theta_{LO}(t)$ between first optical signal and second optical signal are already eliminated and a baseband signal $P_S(t)$ is stored already. That is, after such simple processing, an optical receiver achieves irrelevance with the frequency offset and the phase difference.

It should be noted that, generally, two beams of orthogonally polarized optical signals may be obtained after polarization splitting processing is performed on a received first optical signal. However, in a situation in which the received first optical signal includes only one polarization state, one beam of optical signal, that is, a third optical signal or a fourth optical signal, might be obtained after the polarization splitting processing. When only the third optical signal is output, frequency mixing is performed on the third optical signal and a fifth optical signal. When only the fourth optical signal is output, frequency mixing is performed on the fourth optical signal and a sixth optical signal. After optical-electrical conversion is performed separately, a path of electrical signals is output. When the operation of the sum of squares is performed, the electrical signal is delayed for half a period, and the operation of the sum of operation is performed on the delayed electrical signal and the output electrical signal to obtain a third electrical signal. The frequency mixing does not affect each optical signal, and only a plurality of optical signals is mixed as one optical signal for transmission.

208. Obtain a baseband signal $P_S(t)$ of the first optical signal according to the output third electrical signal $I_I(t)^2+I_Q(t)^2=R^2P_S(t)P_{LO}$, perform data restoration processing on the baseband signal $P_S(t)$, restore a data signal, and send the restored signal data.

A person skilled in the art may learn that the first optical signal passes a data and clock recovery unit to trigger an extraction of a threshold value and a subsequent filtering unit to complete sampling and restoration of an electrical signal, and to restore data according to the clock signal to complete an entire coherent receiving process.

Step 208 may be implemented by using a software algorithm, a processor, digital signal processing (Digital Signal Processing, DSP for short), a hardware circuit, or any combination of them. The hardware circuit may include a storage, an adder, a multiplier, and the like.

In addition, a bit period may be further estimated and calculated according to data extracted in the data restoration process, and a clock of a receiver in the phase modulation process is adjusted according to the estimated bit period.

The method provided in the embodiment enables correct coherent receiving of a locally generated second optical signal in a situation in which an arbitrary frequency offset exists between the second optical signal and the first optical signal, thereby greatly reducing complexity of system implementation and maximally reducing a system upgrade cost and an optical power loss. The method applies to various PON scenarios, including but not limited to coherent receiving such as TDMA-PON burst, WDM, so that the terminal ONU does not need precision control, greatly decreasing requirements on an adjustment step and precision of an optical local oscillator in the central office. The narrow-linewidth is not required. A high receiving sensitivity may be implemented and a power budget may be improved. In addition, an intermediate frequency drift problem in coherent demodulation due to an unstable ONU wavelength is solved, and accurate baseband signal restoration is allowed to be carried out within any frequency offset range.

Figure 4:
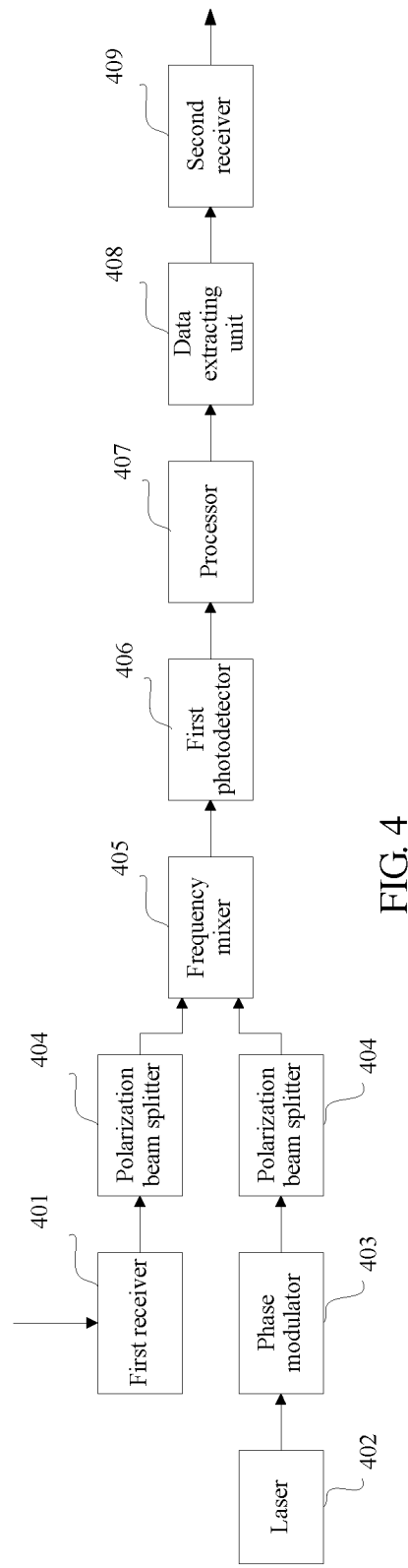
FIG. 4 is a schematic structural diagram of an optical receiver according to an embodiment of the present invention.

FIG. 4 is a schematic structural diagram of an optical receiver according to an embodiment of the present invention. The optical receiver may be located in a piece of central office equipment and the central office equipment may specifically be an OLT. Refer to FIG. 4. An optical receiver includes but is not limited to a first receiver 401, a laser 402, a phase modulator 403, two polarization beam splitters 404, at least one frequency mixer 405, a first photodetector 406, a processor 407, a data extracting unit 408, and a second receiver 409.

The first receiver 401 is configured to receive a first optical signal sent by an optical network unit; where
the first optical signal is an optical signal received from the optical network unit by using an optical distribution network.

The laser 402 is configured to generate a second optical signal and send the second optical signal to the phase modulator 403; where
polarization vibration directions of the generated second optical signal and the received first optical signal are the same.

The phase modulator 403 is configured to modulate a phase of the second optical signal so that a difference between a phase of the second optical signal in the second half period and a phase of the second optical signal in the first half period is 90 degrees, where the one period is time required for transmitting any 1 bit in the first optical signal; where
the phase modulator periodically generates a sine wave and a cosine wave. The sine wave is generated in the first half period to perform modulation on the second optical signal, so that the phase of the second optical signal is unchanged. The cosine wave is generated in the second half period, so that the phase of the second optical signal reverses by 90 degrees. For a correspondence between a time point and a reversed phase in each period during the phase modulation, reference may be made to FIG. 3. In each bit period of the first optical signal, if a start time point of a bit period is considered as 0, a modulated phase amplitude of the second optical signal within (0, T/2) is 0, and a modulated phase amplitude of the second optical signal within (T/2, T) is $\pi/2$.

The polarization beam splitter 404 is configured to perform polarization splitting separately on the first optical signal and the second optical signal and then input the polarization-split optical signals to the frequency mixer 405.

A person skilled in the art may learn that, after polarization splitting processing on an optical signal, two beams of output optical signals are in mutually vertical polarization states and have same optical power.

Preferably, the polarization beam splitter 404 is specifically configured to output a third optical signal and/or a fourth optical signal after the polarization splitting processing on the first optical signal; output a fifth optical signal and a sixth optical signal after the polarization splitting processing on the phase-modulated second optical signal, where a polarization state of the fifth optical signal and a polarization state of the sixth optical signal are mutually vertical.

The frequency mixer 405 is configured to perform frequency mixing processing on the polarization-split optical signals.

Preferably, the frequency mixer 405 is specifically configured to perform frequency mixing processing on the fifth optical signal and an optical signal that is mutually parallel with the fifth optical signal in polarization state, where the optical signal is either the third optical signal or the fourth optical signal, and/or perform frequency mixing processing on the sixth optical signal and an optical signal that is mutually parallel with the sixth optical signal in polarization state, where the optical signal is either the fourth optical signal or the third optical signal, and output optical signals that have undergone the frequency mixing processing to the first photodetector 406.

The first photodetector 406 is configured to perform optical-electrical conversion after detecting the optical signals that have undergone the frequency mixing processing, and output at least one path of electrical signals.

The processor 407 is configured to perform operation processing on the at least one path of electrical signals, and output a third electrical signal.

Preferably, the at least one path of electrical signals including a first electrical signal and a second electrical signal, and the processor 407 is specifically configured to perform processing on a first electrical signal for delaying half a period, perform an operation of a sum of squares for a delayed first electrical signal and the second electrical signal, and output a third electrical signal, where an amplitude of the third electrical signal is irrelevant to a frequency offset between the first optical signal and the second optical signal.

The data extracting unit 408 is configured to restore a data signal according to the third electrical signal.

The second receiver 409 is configured to send the restored data signal.

Figure 6:
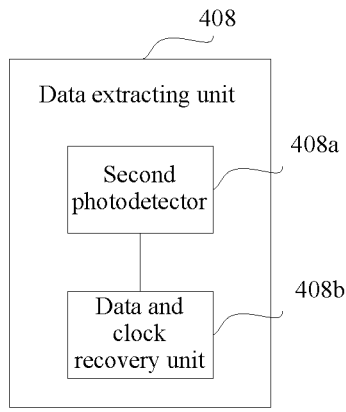
FIG. 6 is a schematic structural diagram of a data extracting unit according to an embodiment of the present invention.

Preferably, referring to FIG. 6, the data extracting unit 408 further includes: a second photodetector 408a and a data and clock recovery unit 408b; where the second photodetector 408a is configured to input the third electrical signal to the data and clock recovery unit after detecting the third electrical signal; and the data and clock recovery unit 408b is configured to obtain a baseband signal of the first optical signal according to the third electrical signal, perform data restoration processing on the baseband signal, restore a data signal, and send the restored data signal.

A person skilled in the art may learn that the first optical signal passes the second photodetector 408a and the data and clock recovery unit 408b to complete sampling and restoration of an electrical signal, and to restore data according to a clock signal, so as to complete an entire coherent receiving process.

The optical receiver shown in FIG. 4 includes only one frequency mixer 405. In a situation in which a first optical signal received by a first receiver 401 includes only one polarization state, a beam of optical signal, that is, a third optical signal or a fourth optical signal, may be output after polarization splitting processing by a polarization beam splitter 404. When only the third optical signal is output, a frequency mixer 45 performs frequency mixing for the third optical signal and a fifth optical signal. When only the fourth optical signal is output, a frequency mixer 405 performs frequency mixing for the fourth optical signal and a sixth optical signal. After a first photodetector 406 performs optical-electrical conversion separately, a path of electrical signals is output. When performing an operation of a sum of squares, a processor 407 delays the electrical signal for half a period, and performs an operation of a sum of squares for the delayed electrical signal and the output electrical signal to obtain a third electrical signal.

Figure 5:
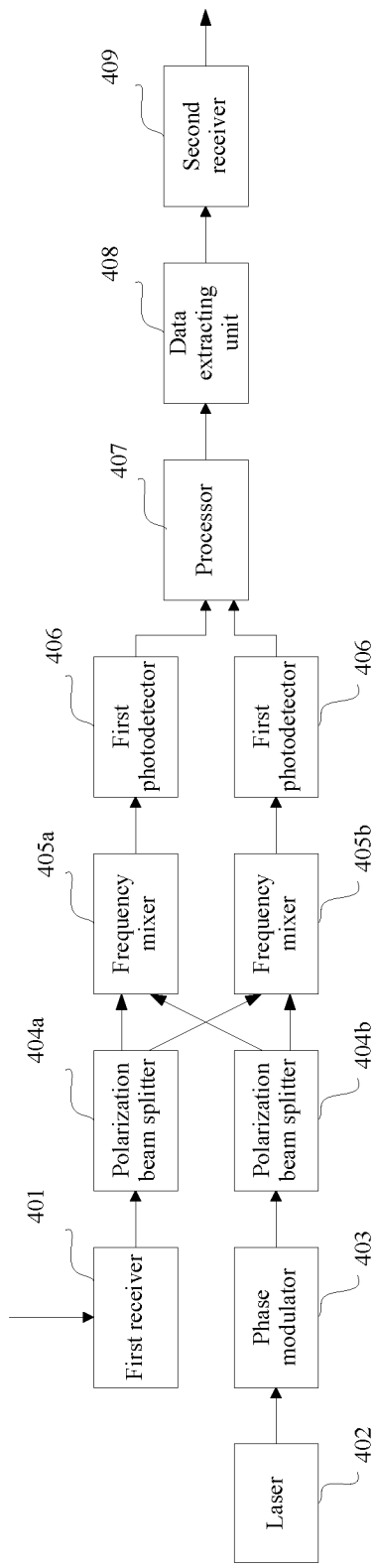
FIG. 5 is a specific schematic structural diagram of an optical receiver according to an embodiment of the present invention.

FIG. 5 is a schematic structural diagram of an optical receiver according to an embodiment of the present invention. The optical receiver includes two frequency mixers 405a and 405b. Specific functions of the frequency mixers 405a and 405b are the same as a frequency mixer 405. The two frequency mixers 405a and 405b perform frequency mixing separately for optical signals output by two polarization beam splitters 404a and 404b. It should be noted that, generally, two beams of orthogonally polarized optical signals may be output after a received first optical signal passes a polarization beam splitter; specifically, the polarization beam splitter 404a performs polarization splitting processing on a first optical signal $E_S$ to obtain a third optical signal $E_{SI}$ and a fourth optical signal $E_{SQ}$, where the third optical signal $E_{SI}$ is a vertical component of the first optical signal $E_S$ and the fourth optical signal $E_{SQ}$ is a horizontal component of the first optical signal $E_S$, and outputs the third optical signal $E_{SI}$ to the frequency mixer 405a and the fourth optical signal to the frequency mixer 405b; the polarization beam splitter 404b performs polarization splitting processing on the second optical signal $E_{LO}$ to obtain a fifth optical signal $E_{LOI}$ and a sixth optical signal $E_{LOQ}$, where the fifth optical signal $E_{LOI}$ is a vertical component of the second optical signal $E_{LO}$ and the sixth optical signal $E_{LOQ}$ is a horizontal component of the second optical signal $E_{LO}$, and outputs the fifth optical signal $E_{LOI}$ to the frequency mixer 405a and the sixth optical signal $E_{LOQ}$ to the frequency mixer 405b; the frequency mixer 405a performs frequency mixing processing on the third optical signal $E_{SI}$ and the fifth optical signal $E_{LOI}$, performs optical-electrical conversion for the optical signals that have undergone the frequency mixing processing, and output a first electrical signal $I_I(t)=R\sqrt{P_sP_{LO}}\cos\{w_{IF}t+\theta_s(t)-\theta_{LO}(t)\}$, where, R is responsivity of the optical receiver, $P_s$ is power of the first optical signal, $P_{LO}$ is power of the second optical signal, $w_{IF}$ is a frequency offset between the first optical signal and the second optical signal, $\theta_{sig}(t)-\theta_{LO}(t)$ is a phase difference between the first optical signal and the second optical signal, and T is time; the frequency mixer 405b performs frequency mixing processing on the fourth optical signal $E_{SQ}$ and the sixth optical signal $E_{LOQ}$, performs the optical-electrical conversion for the optical signals that have undergone the frequency mixing processing, and output a second electrical signal $I_Q(t)=R\sqrt{P_sP_{LO}}\sin\{w_{IF}t+\theta_s(t)-\theta_{LO}(t)\}$; a processor 407 delays the first electrical signal $I_I(t)=R\sqrt{P_sP_{LO}}\cos\{w_{IF}t+\theta_s(t)-\theta_{LO}(t)\}$ for half a period, and performs an operation of a sum of squares for a delayed first electrical signal and the second electrical signal $I_Q(t)=R\sqrt{P_sP_{LO}}\sin\{w_{IF}t+\theta_s(t)-\theta_{LO}(t)\}$, and output a third electrical signal $I_1(t)^2+I_Q(t)^2=R^2P_S(t)P_{LO}$. Before the operation of the sum of squares is performed, the first electrical signal needs to be delayed so that $\{w_{IF}t+\theta_s(t)-\theta_{LO}(t)\}$ can be eliminated, that is, impact of the frequency offset between the first optical signal and the second optical signal can be eliminated, after the operation of the sum of squares is performed on the delayed first electrical signal and the second electrical signal.

Generally, two beams of orthogonally polarized optical signals may be obtained after the polarization splitting processing is performed on the received first optical signal, where the frequency mixing does not affect each optical signal and only a plurality of optical signals is mixed as an optical signal for transmission. In a common coherent receiver, to obtain cosine and sine current components of an optical signal, use of a 90-degree optical frequency mixer is required, and a cost is significantly high. However, a cost of the 2×2 frequency mixer used herein is significantly low; in addition, two balancing receivers are reduced, thereby further reducing system complexity. In subsequent electrical domain processing, fewer resources are occupied, which meets a low cost requirement for an access network.

The optical receiver provided in the embodiment enables correct coherent receiving of a locally generated second optical signal in a situation in which an arbitrary frequency offset exists between the second optical signal and the first optical signal, thereby greatly reducing complexity of system implementation and maximally reducing a system upgrade cost and an optical power loss. Further, use of a 90-degree optical frequency mixer is not required and a structure of the optical receiver is simple.

The optical receiver provided in the embodiment applies to a TDMA PON or WDM PON system, and may be located in a piece of central office equipment OLT or in an optical network unit ONU. In a practical system, use of a high-precision narrow-linewidth laser with a significantly high cost at the ONU and OLT sides may be avoided, and a common non-cooling DFB laser may be used. Currently, this type of laser is widely deployed on an ONU end. In addition, precision control and a feedback loop of a wavelength difference between the optical local oscillator and optical signal are avoided.

The optical receiver provided in the embodiment applies to a TDMA PON system that is widely deployed, a splitter (Splitter) is used in the middle, and the ONU communicates with the OLT by means of time division multiplexing. The ONU is a non-cooling DFB laser and is compatible with an existing ODN. The deployment cost is significantly low. In addition, sensitivity of the receiver is improved, meeting the requirement of developing a long-distance and high-density PON.

Figure 7:
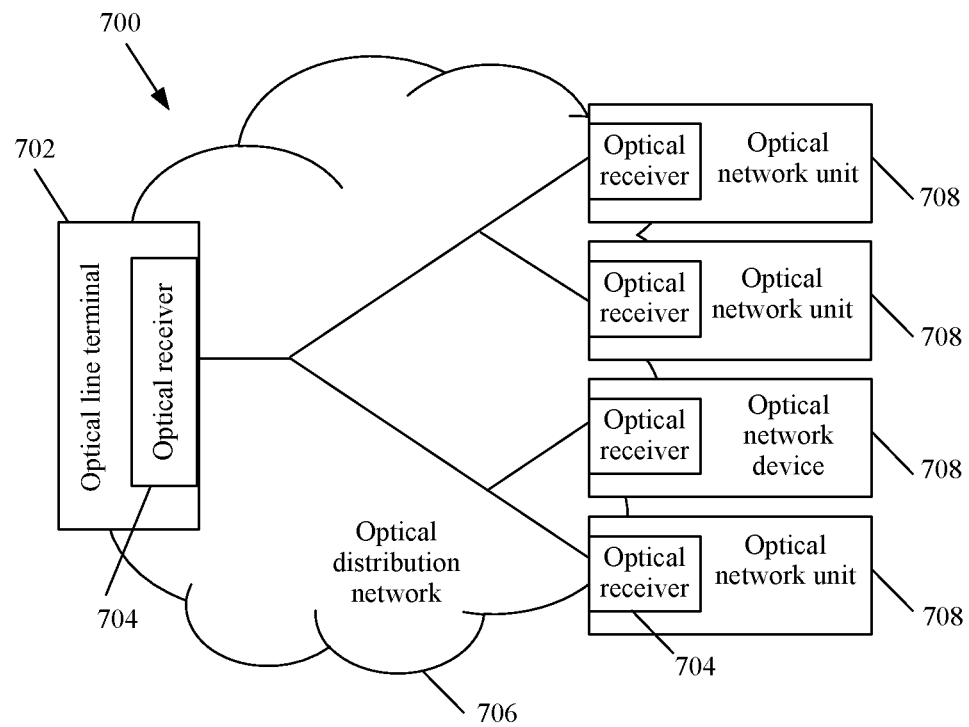
FIG. 7 is a schematic structural diagram of a TDMA PON system according to an embodiment of the present invention.

An embodiment of the present invention further provides an optical network system, as shown in FIG. 7. The optical network system 700 includes at least an optical line terminal 702 and an optical network unit 708. When the optical network system is a time division multiplexing optical network TDMA PON system, the optical line terminal 702 connects to at least one optical network unit 708 by using an optical distribution network 706, where the optical line terminal 702 and/or the optical network unit 708 includes an optical receiver 704, where a schematic structural diagram of the optical receiver 704 is any optical receiver shown in FIG. 4 or FIG. 5. When the optical network system is a wavelength division multiplexing optical network WDM PON system, the optical line terminal connects to an optical network unit by using a wavelength division multiplexer, where the optical line terminal and/or the optical network unit includes an optical receiver, and a schematic structural diagram of the optical receiver may be any optical receiver shown in FIG. 4 or FIG. 5.

Further, the optical receiver of a central office equipment receives a first optical signal sent by the optical network unit by using the optical distribution network, locally generates a second optical signal, and modulates a phase of the second optical signal so that a difference between a phase of the second optical signal in the second half period and a phase of the second optical signal in the first half period is 90 degrees, where the one period is time required for transmitting any 1 bit in the first optical signal; obtains at least one path of electrical signals after the first optical signal and the second optical signal separately undergo polarization splitting, frequency mixing, and optical-electrical conversion; performs operation processing on the at least one path of electrical signals, and outputs a third electrical signal; restores a data signal according to the third electrical signal and sending the restored data signal. A process of processing a signal by the optical receiver is executed according to a method of the embodiment illustrated in FIG. 2.

A structure of the optical receiver specifically includes:
a first receiver, configured to receive a first optical signal sent by an optical network unit;
a laser, configured to generate a second optical signal and send the second optical signal to a phase modulator;
the phase modulator, configured to modulate a phase of the second optical signal so that a difference between a phase of the second optical signal in the second half period and a phase of the second optical signal in the first half period is 90 degrees, where the one period is time required for transmitting any 1 bit in the first optical signal;
the polarization beam splitter, configured to perform polarization splitting separately on the first optical signal and the second optical signal and then input the polarization-split optical signals to a frequency mixer;
the frequency mixer, configured to perform frequency mixing processing on the polarization-split optical signals;
a first photodetector, configured to perform optical-electrical conversion after detecting the optical signals that have undergone the frequency mixing processing, and output at least one path of electrical signals;
a processor, configured to perform operation processing on the at least one path of electrical signals, and output a third electrical signal;
a data extracting unit, configured to restore a data signal according to the third electrical signal; and
a second receiver, configured to send the restored data signal.

Further, the polarization beam splitter is specifically configured to output a third optical signal and/or a fourth optical signal after the polarization splitting processing on the first optical signal; output a fifth optical signal and a sixth optical signal after the polarization splitting processing on the phase-modulated second optical signal, where a polarization state of the fifth optical signal and a polarization state of the sixth optical signal are mutually vertical.

The frequency mixer is specifically configured to perform frequency mixing processing on the fifth optical signal and an optical signal that is mutually parallel with the fifth optical signal in polarization state, where the optical signal is either the third optical signal or the fourth optical signal, and/or perform frequency mixing processing on the sixth optical signal and an optical signal that is mutually parallel with the sixth optical signal in polarization state, where the optical signal is either the fourth optical signal or the third optical signal, and output optical signals that have undergone the frequency mixing processing to a photodetector.

The at least one path of electrical signals includes a first electrical signal and a second electrical signal, and the processor is specifically configured to perform processing on the first electrical signal for delaying half a period, perform an operation of a sum of squares on a delayed first electrical signal and the second electrical signal, and output a third electrical signal, where an amplitude of the third electrical signal is irrelevant to a frequency offset between the first optical signal and the second optical signal.

The data extracting unit further includes a second photodetector and a data and clock recovery unit; where
the second photodetector is configured to input the third electrical signal to the data and clock recovery unit after detecting the third electrical signal; and
the data and clock recovery unit is configured to obtain a baseband signal of the first optical signal according to the third electrical signal, perform data restoration processing on the baseband signal, restore a data signal, and send the restored data signal.

The optical receiver provided in the embodiment enables correct coherent receiving of a locally generated second optical signal in a situation in which an arbitrary frequency offset exists between the second optical signal and the first optical signal, thereby greatly reducing complexity of system implementation and maximally reducing a system upgrade cost and an optical power loss. Further, use of a 90-degree optical frequency mixer is not required and the structure is simple.

The optical receiver provided in the embodiment applies to a TDMA PON or WDM PON system, and may be located in a piece of central office equipment OLT or in an optical network unit ONU. In a practical system, use of a high-precision narrow-linewidth laser with a significantly high cost at the ONU and OLT sides may be avoided, and a common non-cooling DFB laser may be used. Currently, this type of laser is widely deployed on an ONU end. In addition, precision control and a feedback loop of a wavelength difference between an optical local oscillator and optical signal are also avoided.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A signal processing method, wherein the method comprises:
   receiving a first optical signal sent by an optical network unit;
   generating a second optical signal and modulating a phase of the second optical signal so that a difference between a phase of the second optical signal in a second half period and a phase of the second optical signal in a first half period is 90 degrees, wherein one period is time required for transmitting any 1 bit in the first optical signal;
   obtaining at least one path of electrical signals after the first optical signal and the second optical signal separately undergo polarization splitting, frequency mixing, and optical-electrical conversion;
   outputting a third electrical signal by delaying for half a period a first electrical signal from among the at least one path of electrical signals, and summing squares of the delayed first electrical signal and a second electrical signal from among the at least one path of electrical signals to output the third electrical signal; and
   restoring a data signal according to the third electrical signal and sending the restored data signal.

2. The method according to claim 1, wherein the obtaining at least one path of electrical signals after the first optical signal and the second optical signal separately undergo polarization splitting, frequency mixing, and optical-electrical conversion comprises:
   outputting a third optical signal and/or a fourth optical signal after polarization splitting processing on the first optical signal;
   outputting a fifth optical signal and a sixth optical signal after polarization splitting processing on the phase-modulated second optical signal, wherein a polarization state of the fifth optical signal and a polarization state of the sixth optical signal are mutually vertical;
   performing frequency mixing processing on:
      the fifth optical signal and an optical signal that is mutually parallel with the fifth optical signal in polarization state, wherein the optical signal is either the third optical signal or the fourth optical signal, and/or
      the sixth optical signal and an optical signal that is mutually parallel with the sixth optical signal in polarization state, wherein the optical signal is either the fourth optical signal or the third optical signal; and
   outputting the at least one path of electrical signals after the optical-electrical conversion.

3. The method according to claim 1 wherein an amplitude of the third electrical signal is irrelevant to a frequency offset between the first optical signal and the second optical signal.

4. The method according to claim 1, wherein the restoring a data signal according to the third electrical signal and performing sending comprises:
   obtaining a baseband signal of the first optical signal according to the third electrical signal; and
   performing data restoration processing on the baseband signal to restore a data signal, and sending the restored data signal.

5. An optical receiver, wherein the optical receiver comprises:
   a first receiver, configured to receive a first optical signal sent by an optical network unit;
   a laser, configured to generate a second optical signal and send the second optical signal to a phase modulator,
      the phase modulator, configured to modulate a phase of the second optical signal so that a difference between a phase of the second optical signal in a second half period and a phase of the second optical signal in a first half period is 90 degrees, wherein one period is time required for transmitting any 1 bit in the first optical signal;
   a polarization beam splitter, configured to perform polarization splitting separately on the first optical signal and the second optical signal and input the polarization-split optical signals to a frequency mixer,
      the frequency mixer, configured to perform frequency mixing processing on the polarization-split optical signals;
   a first photodetector, configured to perform optical-electrical conversion after detecting the optical signals that have undergone the frequency mixing processing, and output at least one path of electrical signals, including outputting a third electrical signal by delaying for half a period a first electrical signal from among the at least one path of electrical signals, and summing squares of the delayed first electrical signal and a second electrical signal from among the at least one path of electrical signals to output the the third electrical signal;
   a data extracting unit, configured to restore a data signal according to the third electrical signal; and
   a second receiver, configured to send the restored data signal.

6. The optical receiver according to claim 5, wherein the polarization beam splitter is configured to:
   output a third optical signal and/or a fourth optical signal after the polarization splitting processing on the first optical signal;
   output a fifth optical signal and a sixth optical signal after the polarization splitting processing on the phase-modulated second optical signal, wherein a polarization state of the fifth optical signal and a polarization state of the sixth optical signal are mutually vertical.

7. The optical receiver according to claim 6, wherein the frequency mixer is configured to perform frequency mixing processing on:
   the fifth optical signal and an optical signal that is mutually parallel with the fifth optical signal in polarization state, wherein the optical signal is either the third optical signal or the fourth optical signal, and/or
   the sixth optical signal and an optical signal that is mutually parallel with the sixth optical signal in polarization state, wherein the optical signal is either the fourth optical signal or the third optical signal; and
   output optical signals that have undergone the frequency mixing processing to a photodetector.

8. The optical receiver according to claim 5, wherein an amplitude of the third electrical signal is irrelevant to a frequency offset between the first optical signal and the second optical signal.

9. The optical receiver according to claim 5, wherein the data extracting unit further comprises a second photodetector and a data and clock recovery unit;
   the second photodetector is configured to output the third electrical signal to the data and clock recovery unit after detecting the third electrical signal; and
   the data and clock recovery unit is configured to obtain a baseband signal of the first optical signal according to the third electrical signal, perform data restoration processing on the baseband signal, restore a data signal, and send the restored data signal.

10. An optical network system, wherein the optical network system comprises at least a central office equipment and an optical network unit, and the central office equipment comprises the optical receiver according to claim 5, and/or the optical network unit comprises the optical receiver according to claim 5.

* * * * *